(12) United States Patent
Bartels et al.

(10) Patent No.: US 12,097,885 B2
(45) Date of Patent: Sep. 24, 2024

(54) ASSISTANCE SYSTEM AND METHOD FOR AVOIDING FALSE ACTIVATIONS OF A SHOULDER FUNCTION

(71) Applicant: Volkswagen Aktiengesellschaft, Wolfsburg (DE)

(72) Inventors: Arne Bartels, Wolfsburg (DE); Timo Klingemann, Sassenburg (DE); Thomas Kolms, Wasbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 73 days.

(21) Appl. No.: 17/551,029

(22) Filed: Dec. 14, 2021

(65) Prior Publication Data

US 2022/0185332 A1    Jun. 16, 2022

(30) Foreign Application Priority Data

Dec. 15, 2020   (DE) .......................... 102020215962.9

(51) Int. Cl.
*B60W 60/00* (2020.01)
*B60W 30/18* (2012.01)
*B62D 15/02* (2006.01)

(52) U.S. Cl.
CPC .. *B60W 60/0018* (2020.02); *B60W 30/18109* (2013.01); *B62D 15/021* (2013.01);
(Continued)

(58) Field of Classification Search
CPC ...... B60W 10/18; B60W 30/08; B60W 30/09; B60W 30/0956; B60W 30/12;
(Continued)

(56) References Cited

U.S. PATENT DOCUMENTS 7,302,328 B2 * 11/2007 Kato ..................... B60T 8/1764
                                                 180/443
7,660,669 B2 *  2/2010 Tsuda ................... B60W 30/09
                                                 340/436
(Continued)

FOREIGN PATENT DOCUMENTS

DE   102007029909 A1   1/2009
DE   102012109310 A1   4/2014
(Continued)

*Primary Examiner* — Russell Frejd
*Assistant Examiner* — Brandon Z Willis
(74) *Attorney, Agent, or Firm* — Peter Zura; LOZA & LOZA, LLP

(57) ABSTRACT

Technologies and techniques for operating an assistance system of a motor vehicle for providing a shoulder function. Under a first condition, a motor vehicle is detected on a shoulder of a roadway via at least one detecting apparatus in accordance with at least one predetermined first criterion. Under a second condition, a steering behavior of a driver of the motor vehicle is determined in accordance with a second criterion, where a shoulder function is executed in accordance with which an automatic driving intervention. Under a third condition, an obstacle ahead of the motor vehicle in the direction of travel is detected by the at least one detecting apparatus in accordance with a specified third criterion, where a control signal influencing the execution of the shoulder function is output.

20 Claims, 3 Drawing Sheets

(52) U.S. Cl.
CPC ............. *B60W 2420/403* (2013.01); *B60W 2554/4049* (2020.02)

(58) Field of Classification Search
CPC ..... B60W 30/18172; B60W 30/18109; B60W 40/068; B60W 40/064; B60W 2050/0071; B60W 2050/143; B60W 2050/146; B60W 50/087; B60W 50/14; B60W 50/16; B60W 60/0018; B60W 60/00184; B60W 60/0061; B60W 2510/20; B60W 2510/207; B60W 2520/28; B60W 2420/42; B60W 2540/18; B60W 2552/35; B60W 2552/53; B60W 2554/40; B60W 2554/20; B60W 2554/4044; B60W 2554/4049; B60W 2554/80; B60W 2710/18; B60W 2720/40; B60W 2720/406; B60T 7/22; B60T 7/12; B60T 2201/08; B60T 2210/10; B60T 2210/14; B60T 2220/03; B62D 15/021

See application file for complete search history.

(56) References Cited

U.S. PATENT DOCUMENTS

| | | | |
|---|---|---|---|
| 2004/0016870 A1 | 1/2004 | Pawlicki et al. | |
| 2015/0046015 A1* | 2/2015 | Ulbricht | B60W 30/00 701/1 |
| 2015/0251666 A1* | 9/2015 | Attard | B62D 15/029 701/23 |
| 2017/0297623 A1 | 10/2017 | Busch et al. | |
| 2018/0307234 A1* | 10/2018 | Zhu | B60W 50/02 |
| 2020/0164871 A1 | 5/2020 | Bauer et al. | |
| 2020/0216063 A1* | 7/2020 | Lim | B60W 30/095 |
| 2020/0317218 A1* | 10/2020 | Mao | B60K 31/18 |

FOREIGN PATENT DOCUMENTS

| | | |
|---|---|---|
| DE | 102012220191 A1 | 5/2014 |
| DE | 102014204383 A1 | 9/2015 |
| DE | 102019206875 B3 | 7/2020 |
| EP | 3738852 A1 | 11/2020 |
| JP | 2011073530 A2 | 4/2011 |

* cited by examiner

ASSISTANCE SYSTEM AND METHOD FOR AVOIDING FALSE ACTIVATIONS OF A SHOULDER FUNCTION

CROSS REFERENCE TO RELATED APPLICATION

The present application claims priority to German Patent App. No 10 2020 215 962.9, filed Dec. 15, 2020, the contents of which is incorporated by reference in its entirety herein.

FIELD OF TECHNOLOGY

The present disclosure relates to a technologies and techniques for operating an assistance system of a motor vehicle for providing a shoulder function, wherein at least under the first condition that a shoulder driving of the motor vehicle on a shoulder of a road is detected by means of at least one detecting means in accordance with at least one predetermined first criterion, and under the second condition that a steering behavior of a driver of the motor vehicle, which is determined in accordance with a second criterion, is detected, a shoulder function is executed in accordance with which an automatic driving intervention is carried out. The present disclosure also relates to an assistance system for a motor vehicle for providing a shoulder function.

BACKGROUND

The shoulder of a road is generally regarded as the unsurfaced side strip adjacent to the roadway. It contains, for example, sand, gravel, grass or the like. When a motor vehicle accidentally leaves the roadway, the driver is usually startled and abruptly steers back toward the roadway. This often leads to oversteering of the vehicle, due to the abrupt change in the friction coefficient when transitioning from the shoulder to the road. In such a case, the shoulder function performs an automatic driving intervention to prevent skidding accidents when the driver counter-steers to leave the shoulder. Typically, this shoulder function is activated when, on the one hand, the shoulder driving of the motor vehicle is detected in accordance with a first criterion and when, additionally, on the other hand, a specific steering behavior of the driver is detected in accordance with a second criterion, for example a sharp steering reaction of the driver.

Shoulder driving of the motor vehicle can be detected with a motor vehicle sensor system or, in general, with at least one detecting means. False detections can never be ruled out with such a system. Accordingly, it can happen, for example, that the driver executes a sharp steering reaction and the motor vehicle erroneously detects shoulder driving of the motor vehicle. In such a case, the shoulder function would normally also be activated, which, however, when driving on a normal roadway and not on the shoulder, can lead to a disturbing or irritating driving intervention and possibly a dangerous driving situation, since an unnecessary driving intervention would then be carried out by the motor vehicle. Accordingly, it would be desirable to be able to avoid such false activations.

DE 10 2015 217 783 A1 describes an improved lane assistant that issues a warning to the driver when the vehicle departs from a lane. It is provided here that the output of this warning is suppressed under certain circumstances, in particular if an eye-tracking function detects that the driver has directed his gaze in the direction in which the vehicle is leaving the lane and a possible reason for the departure from the lane was determined. Such a possible reason may be an impending collision with an object located in the lane. However, such a method cannot avoid a false activation of a shoulder function, in particular, it cannot provide a shoulder function as described above.

Furthermore, JP 2011-73530 A describes a method for preventing a vehicle from leaving the lane or for preventing the motor vehicle from colliding with an object. Here, an automatic driving intervention is carried out if an imminent departure from the lane or an imminent collision with an object was detected, unless the driver already carries out a steering intervention himself. However, this also does not prevent false activations of a shoulder function.

Furthermore, US 2020/0164871 A1 describes a method for a lane change assistance system, according to which the driver of a vehicle is warned during an intended lane change if there is another road user in the adjacent lane. However, the output of this warning is suppressed if the lane change leads to a diverging lane, such as the lane of a freeway exit, and the other road user is in a lane other than the one to which the driver wishes to change. However, this also does not prevent false activations of a shoulder function.

SUMMARY

Aspects of the present disclosure are to provide an assistance system and a method that make it possible to at least reduce false activations of a shoulder function.

Certain aspects of the present disclosure are described in the subject matter of the respective independent claims. Additional aspects of the present disclosure are the subject of the dependent claims, the description and the figures.

In some examples, a method is disclosed for operating a first assistance system of a motor vehicle for providing a shoulder function, at least under a first condition that shoulder driving of the motor vehicle on a shoulder of a road is detected by means of at least one detecting means in accordance with at least one predetermined first criterion, and under a second condition that a steering behavior of a driver of the motor vehicle, which is determined in accordance with a second criterion, is detected, a shoulder function is executed in accordance with which an automatic driving intervention is carried out. At least under the third condition that an obstacle ahead of the motor vehicle in the direction of travel is detected by means of the at least one detecting means in accordance with a predetermined third criterion, a control signal influencing the execution of the shoulder function is output. This may, for example, prevent or modify the execution of the shoulder function.

The present disclosure is based on the following insight: If a driver inadvertently drives his motor vehicle unto the shoulder, a sharp steering reaction by the driver in the direction of the roadway follows. This sharp steering reaction is due to the fact that the driver is startled when accidentally driving unto the shoulder and that he wants to get back onto the roadway. In other words, the unintentional driving unto the shoulder is the cause of the sharp steering reaction. If, on the other hand, a driver does not drive his vehicle on the shoulder and a sharp steering reaction occurs then, the reason for the sharp steering reaction cannot be that the motor vehicle is driving on the shoulder. Thus, there must be a different cause for the sharp steering reaction. The most common reason a driver makes a sharp steering reaction when driving on the roadway is to avoid an obstacle ahead. The present disclosure now advantageously uses this knowledge to modify, preferably prevent or abort, the execution of the shoulder function when such an obstacle ahead is detected in accordance with the predetermined third criterion. If a certain steering behavior of the driver, in particular a sharp steering behavior, is detected in accordance with the second criterion and an obstacle ahead is detected at the same time, it is likely that the driver wants to avoid the obstacle, even if a shoulder drive was detected by means of the at least one detecting means in accordance with the first criterion. In other words, in this situation, it is in all likelihood an erroneously detected shoulder drive, and a false activation of the shoulder function can be advantageously avoided in this situation. Consequently, even dangerous situations that may be caused by the false activation of the shoulder function can be efficiently avoided.

As discussed above, the shoulder of a road constitutes an unpaved shoulder adjacent to the roadway, in particular adjacent to the road. The at least one detecting apparatus is associated with the motor vehicle and is thus, in particular, a detecting apparatus of the motor vehicle. This may be understood to mean the entirety of the sensor system of the motor vehicle. In other words, the detecting apparatus can have one or more individual sensors. Sensors of the detecting apparatus of the motor vehicle, in particular different sensors, can be used for detecting shoulder driving in accordance with the first criterion and for detecting the specific steering behavior of the driver in accordance with the second criterion. Even the obstacle ahead can be detected in accordance with the specified third criterion by means of the at least one detecting apparatus of the motor vehicle. Thus, a same or also a different sensor can be used for the detection of the shoulder driving and/or the steering behavior of the driver. Furthermore, the fact that by means of the at least one detecting apparatus shoulder driving of the motor vehicle on a shoulder of the road is detected in accordance with at least one predetermined first criterion does not imply that shoulder driving of the motor vehicle on the shoulder of the road actually occurs. In other words, such detection also comprises erroneously detected shoulder driving. Further, the first and second conditions are intended to be understood as necessary conditions for executing the shoulder function, but not necessarily as sufficient conditions. For example, the shoulder function may not be executed even if the first and second conditions are met, for example if the third condition is also met.

In some examples, a control signal influencing the execution of the shoulder function influences the execution, such that the execution is prevented or aborted, or that the automatic driving intervention is executed with a predetermined reduced intensity. In this way, possible hazards caused by false activations of the shoulder function can be advantageously avoided or at least reduced in their extent. The fact that the driving intervention is executed with a predetermined reduced intensity may be understood, for example, as meaning that the intensity is reduced compared to a predetermined intensity value for the automatic driving intervention.

As described below, the driving intervention is preferably carried out as a braking intervention. For such a braking intervention, a corresponding braking pressure, e.g., 40 bar or 50 bar or 60 bar, can be specified to set its intensity, also depending on whether the driver is braking in the current situation or not, for example. If the driver is currently braking, a higher specified braking pressure can be selected, since additional braking by the driver further increases the risk of skidding. Thus, for example, if the first and second conditions are met, the braking pressure for the driving intervention can be specified depending on the situation, for example. If it is then detected that the third condition is also met, then, for example, if the braking intervention is already in progress in the course of executing the shoulder function, this prespecified braking pressure can be reduced and the shoulder function can be continued with the reduced braking pressure. Preferably, however, the shoulder function is not executed at all if the third condition is met or, if the shoulder function is already in progress, its execution is interrupted. In this way, safety can be maximized.

In another example, the automatic driving intervention may be carried out in the form of automatic wheel-selective braking, in which a specific braking force is applied to the wheels of the motor vehicle that are closer to the shoulder. Such a braking force can be generated by a specified braking pressure. Advantageously, this can prevent oversteering and potential skidding of the vehicle if the driver executes a sharp steering reaction in the direction of the roadway when driving on a shoulder. For example, a braking force can be applied to all wheels located on the side of the vehicle's longitudinal axis that is closer to the shoulder. In particular, these are the wheels that are currently driving on the shoulder. When these wheels return to the roadway as a result of the driver's sharp steering reaction, a sharp change in the coefficient of friction takes place with respect to these wheels. When the wheels drive on the shoulder, the coefficient of friction is significantly lower than when the wheels drive on a paved roadway. In order to prevent oversteering and skidding resulting from this transition, the wheels driving on the shoulder can advantageously be decelerated by this embodiment of the present disclosure, whereby both oversteering and potential skidding can be effectively prevented in most cases.

Furthermore, it may be advantageous if the predetermined first criterion, in accordance with which the shoulder driving is detected, includes sensor data provided by wheel speed sensors of respective wheels of the motor vehicle have a characteristic temporal evolution, such that the temporal evolution of the sensor data of at least one wheel on a first side of the motor vehicle varies more strongly relative to a longitudinal axis of the vehicle than the temporal evolution of at least one wheel on a second side of the motor vehicle opposite the first side relative to the longitudinal axis of the vehicle. For example, if the left wheels, as viewed in the direction of travel, drive on a smooth surface, then the temporal evolution of the sensor data provided by the wheel speed sensors is also smooth. If, on the other hand, the right wheels drive on the shoulder, meaning on an uneven surface, then this is reflected in a evolution of the sensor data from the wheel speed sensors of these right wheels that is not smooth. Based on these different temporal evolutions of the sensor data concerning the right and left wheels, it can therefore be concluded that the right wheels are on the shoulder.

In order to further validate this conclusion, it is further preferred that the predetermined first criterion, in accordance with which the shoulder driving is detected, additionally comprises that the at least one detecting apparatus detects a predetermined relative position of the motor vehicle with respect to a lane marking and/or a roadway boundary. In particular, the detecting apparatus can detect, for example, a derivation with respect to the lane marking line or the edge of the roadway, that is, a certain spatial lateral offset relative to such a boundary in a direction away from the roadway, and conclude from this whether the right wheels are already driving on the shoulder, for example. For example, it is also conceivable to use this relative position of the motor vehicle with respect to a lane marking or roadway boundary as the sole criterion for detecting whether the vehicle is driving on the shoulder. However, it is precisely the combination with the detection by the wheel speed sensors that makes it possible to detect shoulder driving relatively reliably, so that, for example, the probability of false activations is low.

Furthermore, the predetermined second criterion in accordance with which the determined steering behavior of a driver of the motor vehicle is detected may comprise that a detected steering angle and/or a steering angle gradient is greater than a predetermined limit value. This advantageously allows for characterizing a sharp steering reaction of the driver. Higher derivations of the steering angle can also be considered and evaluated for this purpose. Another criterion could be, for example, the steering direction of the driver. For example, a shoulder function is only activated if the driver indeed performs such a steering reaction in the direction of the roadway and not away from the roadway. In the case of slight steering reactions by the driver, on the other hand, automatic driving intervention is necessary in the motor vehicle, since oversteering or skidding is unlikely in such a case anyway.

In some examples, a specified third criterion comprises that the obstacle ahead of the motor vehicle in the direction of travel is in the same lane as the motor vehicle. If, on the other hand, the obstacle is in a different lane, then it is unlikely that a driver would execute a sharp steering reaction because of it. Accordingly, the probability that the activation or execution of the shoulder function is erroneously prevented can be reduced.

In some examples, the specified third criterion comprises that a determined predicted time to collision with the detected obstacle falls below a specifiable value. Such a predicted time to collision with the detected obstacle can be determined, for example, on the basis of a distance of the motor vehicle to the obstacle as well as on the basis of a relative speed between the obstacle and the motor vehicle. Such a prediction is also based on a predicted driving trajectory of the motor vehicle, based on current driving parameters, such as speed, steering angle and orientation of the motor vehicle relative to the roadway. If the time to collision with the obstacle is still very long, it is also unlikely that a driver would execute, because of this, a sharp steering reaction to avoid the obstacle. Thus, if a driver executes a sharp steering reaction in such a situation, it is once again unlikely that this is due to the obstacle ahead, and the shoulder function can still be executed. In the same manner as previously described, this advantageous embodiment of the present disclosure likewise prevents erroneous suppression of execution or activation of the shoulder function.

In some examples, a motor vehicle may include a second assistance system different from the first one, which is a collision avoidance system adapted to detect the obstacle ahead of the motor vehicle in accordance with the specified third criterion, wherein in case the collision avoidance system detects the obstacle, and the control signal affecting the execution of the shoulder function is output. In other words, the object detection and recognition carried out for obstacle detection need not be executed by the first assistance system for providing the shoulder function itself, but advantageously the results of another second assistance system, namely a collision avoidance system, can be used. This allows for enormous cost savings and for implementing the additional function of avoiding false activations of the shoulder function in a particularly simple and efficient manner A collision avoidance system is adapted to detect obstacles ahead of the motor vehicle, in particular obstacles in the same lane, and to take appropriate action, such as a warning or braking intervention, in the event that a collision is imminent. The results of such a system relating to the detection of the obstacle can thus advantageously be provided to the first assistance system.

Such a collision avoidance system can likewise make use of the at least one detecting apparatus for detecting the environment, to detect possible obstacles in the lane ahead of the motor vehicle. In general, the at least one detecting apparatus can use sensors of any design such as a camera and/or radar and/or a laser sensor, LIDAR (light detection and ranging) and/or an ultrasonic sensor. The at least one detecting apparatus may also comprise several of these sensors of different types or of the same type. The wheel speed sensors described above are also to be understood as part of the at least one detecting apparatus of the motor vehicle. Among other things, the collision avoidance system can also merge data from one or more environment sensors, in particular the environment sensors camera, radar, laser and ultrasound just mentioned, and evaluate this merged data with respect to a collision risk, for example based on the predicted time to collision as defined above.

In the simplest case, for example, radar may be used to detect obstacles. In turn, the collision avoidance system may utilize results from other assistance systems of the motor vehicle. For example, the collision avoidance system may use data from the lane departure warning system, which is usually camera-based, to detect the roadway or roadway edge marking and/or the edge of the roadway, in particular to identify the lane where the motor vehicle is currently driving in. In other words, the motor vehicle may also include a further assistance system, such as a lane departure warning system, which is adapted to determine the current lane of the motor vehicle and to issue a warning message when the vehicle departs from this lane, without activation of a direction indicator by the driver. The current lane identified by this lane departure warning system can be used to determine whether or not an obstacle detected by the collision avoidance system is in this current lane. By networking different assistance systems, tasks can be advantageously shared and results from different assistance systems can also be used mutually, making the execution and implementation of these assistance systems particularly cost-efficient and effective. This also enormously shortens computing times, as computing results can be shared and each assistance system does not have to perform the corresponding computing steps itself.

It is further advantageous if the collision avoidance system is configured with different warning stages, depending on the determined predicted time to collision, with the control signal influencing the execution of the shoulder function being output as soon as at least one specific one of the different warning stages or any of the different warning stages is activated by the collision avoidance system. The third condition can thus already be considered to have been met simply when the collision avoidance system activates at least one specific one or any of its different warning stages. When such a warning stage is activated, a corresponding signal can be simultaneously transmitted from the collision avoidance system to the first driver assistance system, which then prevents the activation of the shoulder function or, if the same is already in progress, aborts it.

In some examples, the collision avoidance system may be configured to have, for example, three different warning stages. If a collision is imminent, for example, if the determined predicted time to collision falls below a certain limit value, which is preferably less than 10 seconds, more preferably less than 5 seconds, then the collision avoidance system can warn the driver of the motor vehicle in several stages, for example in two warning stages: In the first stage, a visual and/or acoustic warning can be issued by a display in the central instrument cluster together with a warning sound. A haptic warning, for example by means of a vibration in the steering wheel, is also possible. If the driver does not react to this, then in a second stage, in particular if the time to collision continues to decrease, a haptic warning is issued by a warning jolt of the brake. If the driver does not react to this either, and in particular if the time to collision continues to decrease, the collision avoidance system initiates emergency braking as the third stage. The shoulder function can be aborted or its activation prevented as soon as any of these three stages is active, or only when the second or third stage is active, but not already at the first stage, or the shoulder function is aborted or its activation prevented only when the third stage is active. As an alternative to aborting or preventing it, it is again possible to just reduce the intensity of the automatic driving intervention.

For example, the first stage can be initiated when the time to collision falls below three seconds, the second stage when the time to collision falls below two seconds, and the third stage when the time to collision falls below one second.

To activate the warning stage and the emergency braking, signals are sent from the collision avoidance system on a vehicle data bus to other components in the vehicle, such as the instrument cluster or a brake control system (ESC). Advantageously, the shoulder function or the first assistance system can also listen to the vehicle data bus. If one of the warning stages or even emergency braking is requested, the shoulder function also automatically switches to passive or interrupts an ongoing intervention. Whether the shoulder function is already switched to passive at one of the warning stages or only when emergency braking is activated can also be set or parameterized in the shoulder function, i.e., in the first assistance system.

In some examples, the motor vehicle may include a third assistance system that generates a computer-aided environment model based on sensor data provided by the at least one detecting apparatus, based on position data of the motor vehicle, based on a stored digital road map and based on at least one item of information provided via car-to-x communication, wherein the obstacle is detected in accordance with the third criterion based on the computer-aided environment model. Thus, in this way, the shoulder function can interpret why the driver carries out a sharp steering reaction by using a computer-aided environment model.

Computer-aided environment models will be used in the future for highly automated driving functions, for example. They are fed, among other things, by signals from a plurality of environment sensors, digital road maps and position data, in particular from satellite-based positioning systems such as GPS and/or dead reckoning, as well as from car-to-infrastructure, car-to-server and car-to-car communication, i.e., communication of the vehicle with an infrastructure, e.g. a traffic light, with an Internet server and with another vehicle, or the information obtained from this communication. This environment model includes, for example, roadways, lanes, the position of the motor vehicle on the roadway, the position of other vehicles and road users on the roadway, the position of obstacles on the roadway and at the edge of the roadway, the position of guardrails and traffic signs, information about hazard zones, for example, positions of accidents or the ends of traffic jams, stretches with black ice or aquaplaning, and so on. For example, if an obstacle is detected and it is in the lane of the motor vehicle, then a sharp steering reaction by the driver will very likely to be based on an evasive reaction by the driver. The shoulder function would advantageously be switched passive in this case as well. However, if the obstacle is next to the roadway, then a sharp steering reaction by the driver cannot be based on such an evasive reaction to avoid the obstacle. Accordingly, the shoulder function is also executed in such a case. If then the motor vehicle has such a computer-aided environment model, it can also be used advantageously and efficiently to avoid false activations of the shoulder function, in particular to detect obstacles in the same lane. Here too, the first assistance system does not itself have to be adapted to detect objects, and it is here also possible to make use of the results of other systems.

Furthermore, the present disclosure also relates to an assistance system for a motor vehicle, wherein the assistance system is configured for providing a shoulder function, the assistance system having at least one detecting apparatus, which is adapted to detect shoulder driving of the motor vehicle on a shoulder of a road in accordance with at least one predetermined first criterion and to detect a specific steering behavior of a driver of the motor vehicle in accordance with a second criterion, the assistance system having a control unit, which, at least under the first condition that shoulder driving of the motor vehicle has been detected by means of the at least one detecting apparatus in accordance with the at least one predetermined first criterion, and under the second condition that the specific steering behavior of the driver of the motor vehicle has been detected in accordance with the second criterion, is adapted for activating an execution of a shoulder function, in accordance with which an automatic driving intervention is carried out. The control unit is adapted, at least under the third condition that an obstacle ahead of the motor vehicle in the direction of travel is detected by means of the at least one detecting apparatus in accordance with a predetermined third criterion, to output a control signal influencing the execution of the shoulder function.

The configurations and advantages referred to in the context of the method according to the present disclosure and its embodiments apply in the same way to the assistance system according to the present disclosure. The present disclosure also includes further embodiments of the assistance system having features as described already in connection with the further embodiments of the method according to the present disclosure. For this reason, the corresponding further embodiments of the assistance system according to the present disclosure will not be described again for the sake of brevity.

Moreover, a motor vehicle with such an assistance system, in particular according to further embodiments with one or more of the various assistance systems described in connection with the method according to the present disclosure and its embodiments, is also to be regarded as being part of the present disclosure.

BRIEF DESCRIPTION OF THE DRAWINGS

In the following, embodiments of the present disclosure are described. The figures show.

DETAILED DESCRIPTION

The embodiments described herein are preferred embodiments. In the embodiments, the components described each represent individual features of the present disclosure which are to be considered independently of one another and which each also further the present disclosure independently of one another and thus they are also to be regarded as a being part of the present disclosure, individually or in a combination other than that shown. Furthermore, the described embodiments can also be expanded further by features of the present disclosure described earlier.

In the figures, functionally identical elements are each provided with the same reference signs.

Figure 1:
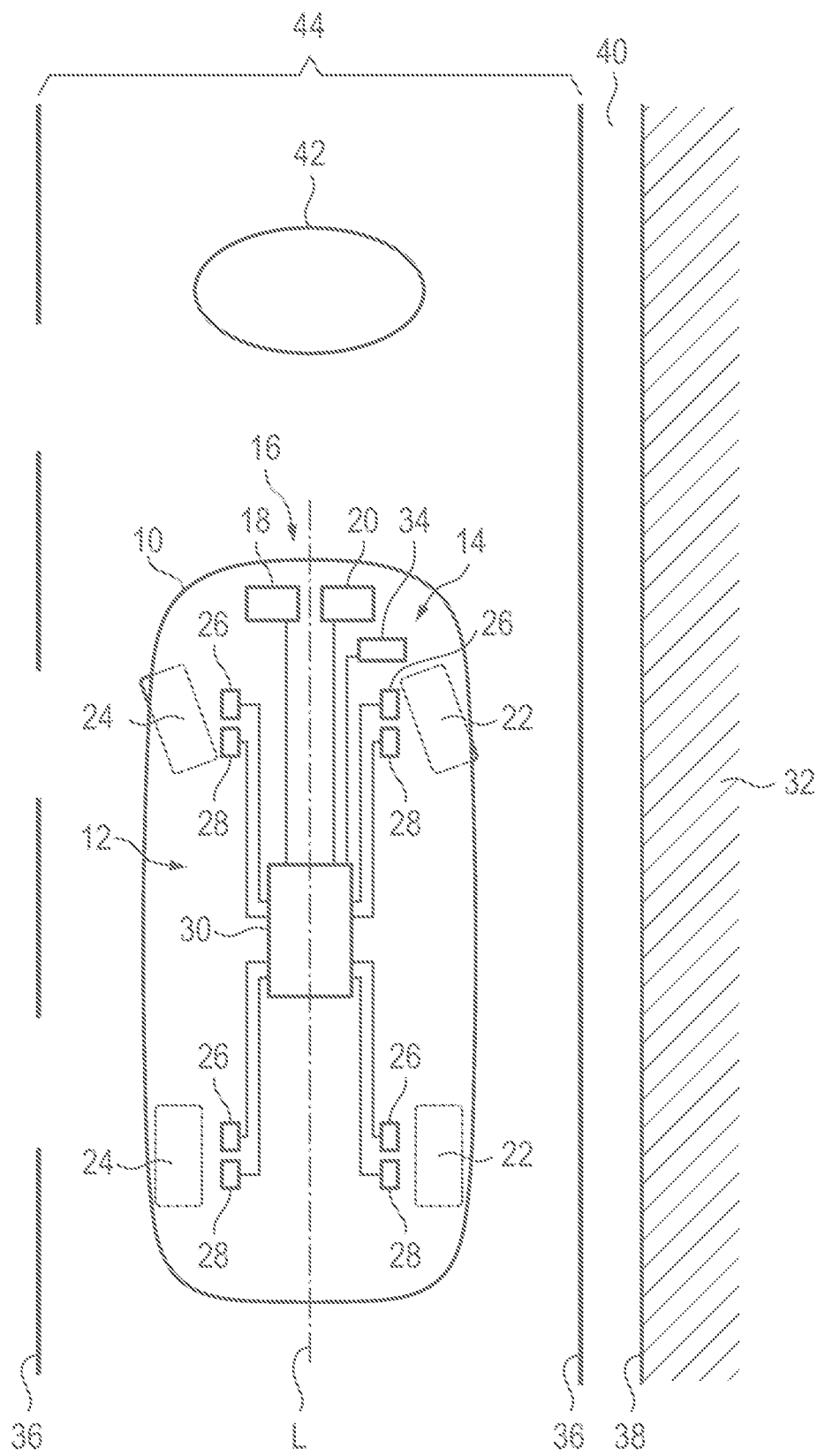
FIG. 1 a schematic top plan view onto a motor vehicle with an assistance system for providing a shoulder function according to some aspects of the present disclosure.

FIG. 1 shows a schematic top plan view onto a motor vehicle 10 with an assistance system 12 for providing a shoulder function according to an embodiment of the present disclosure. The motor vehicle 10, in particular the assistance system 12, has a detecting apparatus 14 which may comprise one or more sensors. In the following example, the detecting apparatus 14 includes environment sensors 16, which are embodied as a camera 18 and radar 20 in this example. Additional or alternative environment sensors can, for example, also be a laser, for example, a LIDAR sensor or an ultrasonic sensor. In addition, as will be described below, the motor vehicle 10 may also have other assistance systems that can likewise use this detecting apparatus 14, such as the environment sensors 16. In other words, to provide the shoulder function, the assistance system 12 can share the specified environment sensor system 16 with other assistance systems. Moreover, in this example, the motor vehicle 10 has four wheels 22, 24, wherein two of the wheels 22 are located to the right of a longitudinal axis L of the vehicle, in particular in the direction of travel of the motor vehicle 10, as viewed when the motor vehicle is moving forward, and the other two wheels 24 are located to the left of the longitudinal axis L of the vehicle. In addition, a wheel speed sensor 26 is assigned each of these wheels 22, as well as an actuator 28 for applying a braking force or a braking pressure to the respective wheels 22.

Furthermore, the assistance system has a control unit 30. This control unit 30 is adapted to execute the shoulder function and, for this purpose, to carry out an automatic driving intervention consisting in braking the wheels 22 of the motor vehicle 10 closer to the shoulder 32 in the event of detected shoulder driving of the motor vehicle 10 and in the event of a detected certain steering behavior of the driver. To detect such a steering behavior, in particular a sharp steering reaction of the driver, the assistance system 12 further comprises a steering angle sensor 34 designed for detecting a steering angle and/or steering gradient or higher temporal derivatives of the steering angle. To detect shoulder driving, e.g., to detect when the wheels 22 of the motor vehicle 10 are driving on the shoulder 32, the temporal evolutions of the sensor data provided by the respective wheel speed sensors 26 of the respective wheels 22, 24 are evaluated. The sensor data from the environment sensors 16 are also evaluated.

The control unit 30 may be adapted to recognize whether shoulder driving is present by means of the environment sensors 16 and the chassis sensors, in particular the wheel speed sensors 26. For example, the forward-facing camera 18 can detect the derivation, that is, the lateral offset, relative to lane marking lines 36 or the edge of the roadway 38 and infer whether, for example, the right wheels 22 are already driving on the shoulder 32, that is, the unpaved surface adjacent to the roadway 40. The roughness of the surface can be inferred from the temporal evolution of the wheel speed sensors 26: For example, if the temporal evolution of the left wheels 24 is smooth and that of the right wheels 22 is not smooth, then the right wheels 22 are driving on the shoulder 32. If, at the same time, based on the detection of the steering angle sensor 34, a sharp steering reaction by the driver to leave the shoulder 32 is observed, then the shoulder function executed by the assistance system 12 activates wheel-selective braking on the wheels 22 driving on the shoulder 32 by controlling the associated actuators 28. This prevents oversteering and potential skidding of the vehicle 10.

With conventional systems for carrying out a shoulder function, false activations can occur. A false activation of the shoulder function means that, although the vehicle 10 drives on the roadway 40 with all wheels 22, 24, the shoulder function is erroneously activated anyway. A false activation of the shoulder function is annoying or irritating to the driver and is therefore undesirable. It is also potentially dangerous, if the vehicle would depart from the lane because of it. A false activation of the shoulder function could occur if environment sensors 16 and chassis sensors 26 erroneously detect a shoulder and the driver simultaneously carries out a sharp steering movement, for example, to avoid an obstacle 42. More specifically, the vehicle 10 is driving, for example, on a road 40 with a rough surface, such as cobblestones or a service road. The evaluation of the signals from the wheel speed sensors 26 could then indicate that the vehicle is driving on a shoulder. At the same time, the forward-facing camera 18 erroneously reports a crossing of the edge of the roadway 38 because, for example, it mistakes a cast shadow or a wheel track in the rain for the edge of the roadway 38. At the same time, the driver must swerve to avoid an obstacle 42, such as a bicyclist, pedestrian, vehicle, and so on. In conventional systems, this could then lead to a false activation of the shoulder function.

The present disclosure and its embodiments allow to advantageously prevent such false activations or at least reduce their frequency. This can be achieved, for example, by linking the shoulder function with an extended environment detection for detecting obstacles 42 on the roadway 40 for the purpose of avoiding false activations of the shoulder function. In doing so, not only the camera 18 for detecting the edge of the roadway 38, but possibly also other sensors, as already described, for detecting obstacles 42 on the roadway 40 are used as environment sensors 16. In some examples, the present disclosure is based on the following finding: If the driver steers sharply and, at the same time, the extended environment detection 16 detects an obstacle 42 in front of the vehicle 10, in particular in the same lane 44 as the motor vehicle 10, then the shoulder function is switched passive by the control device 30 or, if it is already engaged, is switched off. This is because the driver's sharp steering movement in this case is obviously not intended to leave the shoulder 32, but to avoid a collision with this detected obstacle 42 on the roadway 40, which is located directly in front of the vehicle 10. In this way, any false activation of the shoulder function caused by a sharp steering movement by the driver to avoid a collision can be avoided.

In the present example, such an obstacle 42, which is located in the same lane 44 as the motor vehicle 10 and may be located at a very short temporal distance from the vehicle 10, and can be detected by the aforementioned environment sensors 16, that is, for example, by the camera 18 and/or other sensors, such as radar 20. The detection of this existing obstacle 42 can be executed by the control unit 30. If, based on the sensor data from the environment sensors 16, said control unit detects such an obstacle 42 in accordance with the aforementioned criteria, said control unit prevents the execution of the shoulder function or interrupts it if it is already being executed. However, the detection of this obstacle 42 can also be handled by other assistance systems of the motor vehicle 10, if such assistance systems are present in the motor vehicle 10 anyway. In this way, existing resources can be used particularly efficiently. This is now described with reference to FIG. 2 and FIG. 3.

FIG. 2 again shows a schematic representation of a motor vehicle 10 with the assistance system 12 for providing the shoulder function as well as a further assistance system, namely a collision avoidance system 46. In the simplest case, one or more forward-facing sensors such as camera 18, radar 20, laser or ultrasonic sensors can be used to detect obstacles 42 on the roadway 40. Their signals may also advantageously be merged to ensure the highest possible reliability and integrity in obstacle detection 42.

Figure 2:
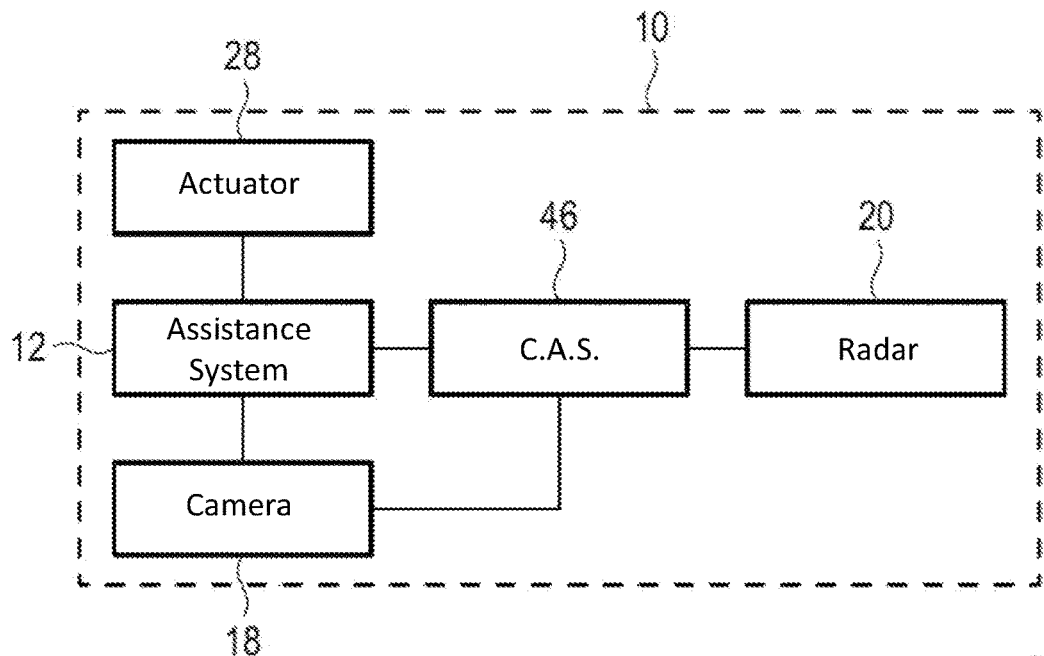
FIG. 2 a schematic illustration of a motor vehicle with an assistance system for providing a shoulder function and its interconnection with a collision avoidance system of the motor vehicle according some aspects of the present disclosure.
Figure 3:
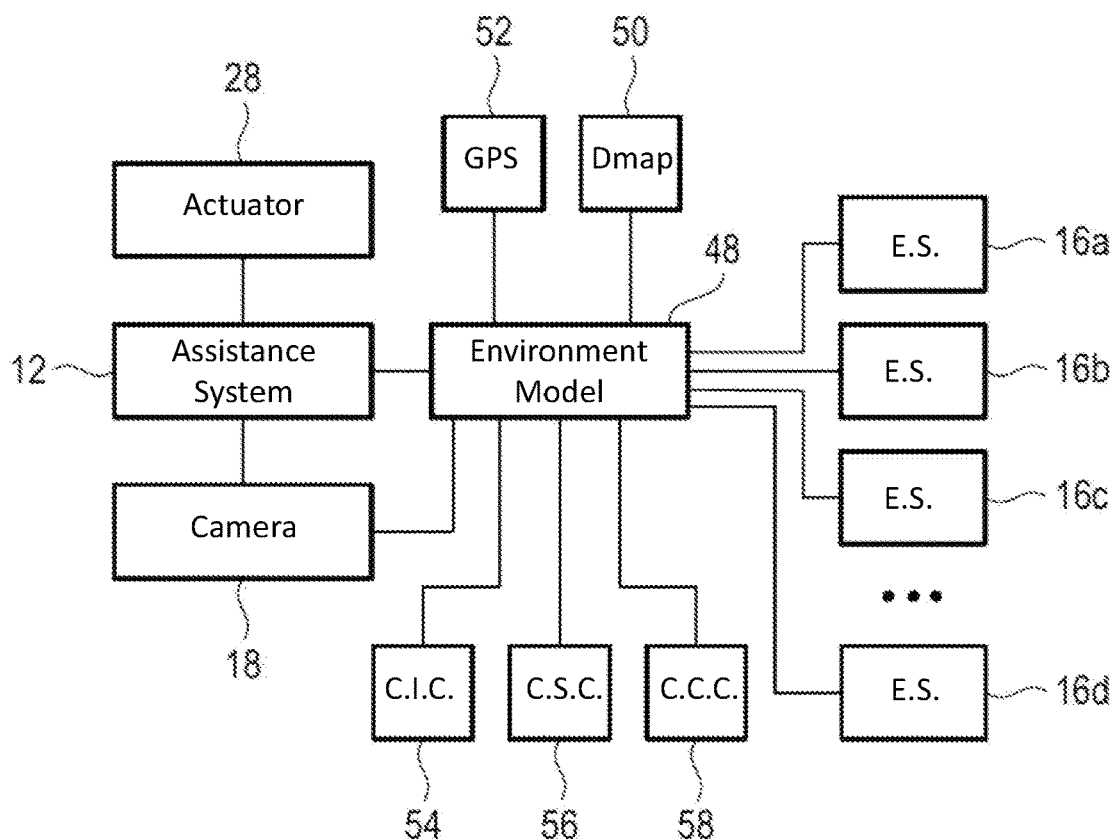
FIG. 3 a schematic illustration of a motor vehicle with an assistance system for providing a shoulder function and its interconnection with a computer-aided environment model according to some aspects of the present disclosure.

Ideally, the shoulder function, i.e., the assistance system 12, does not have to merge the sensor data itself and evaluate it with respect to an imminent collision, but rather the signals of a collision avoidance system 46 existing in the vehicle can be used. This collision avoidance system 46 may be adapted to merge the data from one or more environmental sensors 16 and evaluate it with respect to a risk of a collision with an obstacle 42 ahead. As described, such an obstacle may be another road user, such as a bicyclist, a pedestrian, another vehicle, and so forth. Objects or animals may also constitute such obstacles. In the simplest case, radar 20, for example, is used to detect obstacles 42, as illustrated in FIG. 2. The sensor data provided by the radar 20 are analyzed by the collision avoidance system 46 as well as sensor data provided by the camera 18. Based on this, the collision avoidance system 46 can, on the one hand, detect obstacles 42 ahead and, on the basis of the camera data 18, additionally identify whether or not such an obstacle 42 is in the same lane 44 as the motor vehicle 10. The collision avoidance system 46 can also use the data of another assistance system not explicitly shown here, namely a lane departure warning system, which can also be camera-based, for obstacle detection, in particular for detecting the roadway 40 or the roadway edge marking 36 or the edge of the roadway 38. Furthermore, the data provided by the radar 20 can also be used by other assistance systems, for example an ACC (adaptive cruise control).

Thus, if the collision warning system detects an obstacle, this can be communicated to the first assistance system 12 for providing a shoulder function, which prevents or aborts the execution of the shoulder function.

If a collision is imminent, then it may be provided that the collision avoidance system 46 first issues a warning to the driver in two stages prior to activating emergency braking as a third stage. In the first stage, a visual and/or acoustic warning can be issued by a display in the central instrument cluster together with a warning sound. If the driver does not react to this, then in a second stage a haptic warning can be automatically executed through a warning jolt of the brake of the motor vehicle 10. If the driver does not react to this either, then the collision avoidance system 46 initiates emergency braking, at least if the time to collision has decreased below a critical limit value. To activate the warning stages and the emergency braking, signals are sent by the collision avoidance system 46 on a vehicle data bus to other components in the motor vehicle 10, to which vehicle data bus the first assistance system 12 is also connected, so that it also receives this information about a detected obstacle 42.

Based on this, the shoulder function can thus advantageously prevent the shoulder function from being activated or can deactivate the execution of the shoulder function. It may be provided that such an interruption or modification of the activation of the shoulder function is executed only at the third warning stage defined above, second warning stage or already from the first warning stage of the collision avoidance system 46. In this way, the shoulder function can be significantly improved with respect to possible false activations, whereby such an improvement can furthermore be executed in a particularly efficient manner, since other assistance systems of the motor vehicle 10, which are present anyway, can be efficiently used for this purpose.

In more complex cases, using a computer-aided environment model, the shoulder function can interpret why the driver carries out a sharp steering reaction. This is now described with reference to FIG. 3. Such an environment model carries the reference sign 48. Computer-aided environment models 48 will be used in the future for highly automated driving functions, for example. Among other things, they are fed from the signals of a plurality of environment sensors 16a, 16b, 16c, 16d, which can be used in addition to the existing front camera. In addition, a digital road map 50, GPS position data 52 provided by a GPS receiver of the motor vehicle 10, and information from a communication with devices external to the vehicle are used to generate this environment model 48. Such devices external to the vehicle additionally represent infrastructure components, Internet servers or other vehicles. Accordingly, these communications, generally referred to as car-to-X communications, are specifically referred to as car-to-infrastructure communications 54, car-to-server communications 56, and car-to-car communications 58. In other words, the environment model 48 may be generated based on information that may be obtained from other motor vehicles, infrastructure components external to the motor vehicle, or Internet servers. Such an environment model 48 includes corresponding information about roadways 40, lanes 44, the current position of the own ego vehicle 10 on the roadway 40, the position of other vehicles on the roadway 40, the position of obstacles 42 on the roadway 40 and on the edge of the roadway 38, the position of guardrails and traffic signs, information about hazard zones, and so on. For example, if an obstacle 42 is detected based on this environment model 48 and it is in the lane 44 of the motor vehicle 10, then a sharp steering reaction by the driver is very likely due to an evasive reaction by the driver. The shoulder function is thus switched passive by the assistance system 12, in particular by the control unit 30. However, if the obstacle is next to the roadway 40, then a sharp steering reaction by the driver cannot be due to such an evasive reaction to avoid this obstacle. The shoulder function continues to be executed accordingly.

Figure 4:
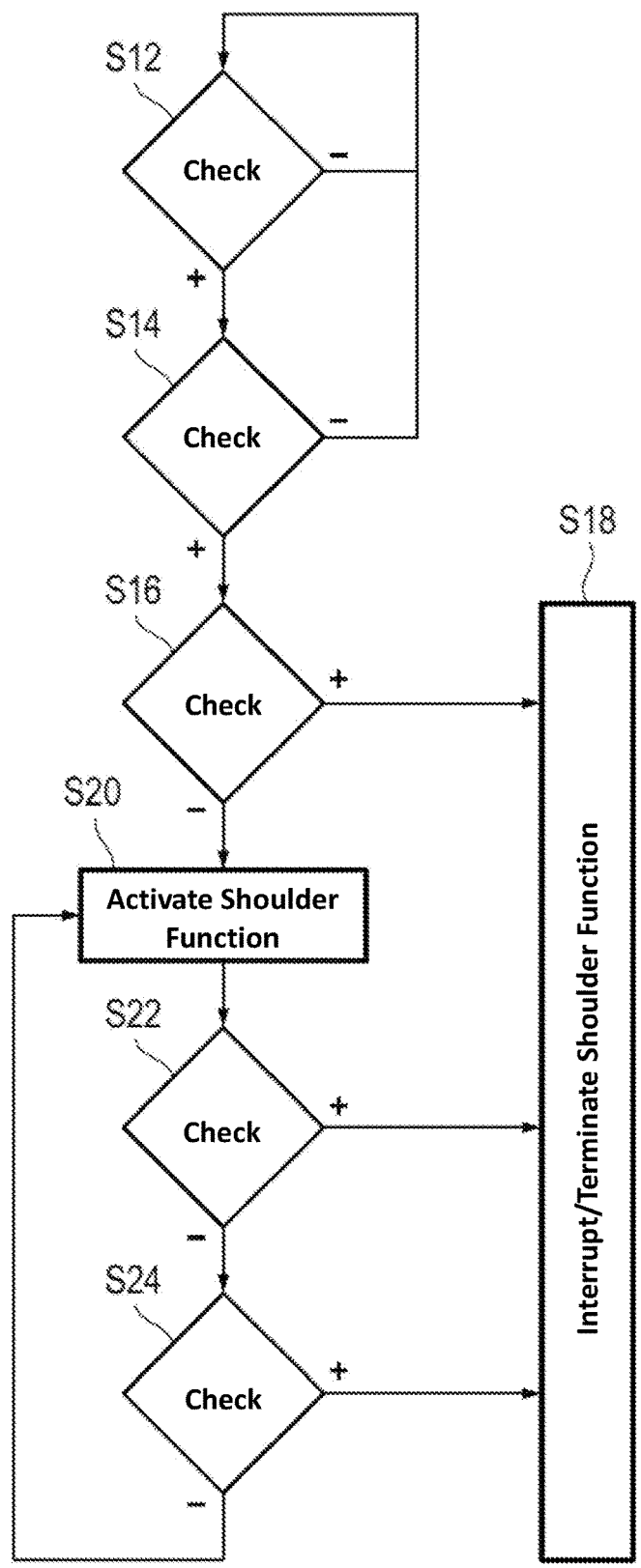
FIG. 4 a flow chart for illustrating a method for operating an assistance system for providing a shoulder function according to some aspects of the present disclosure.

FIG. 4 shows a flow chart for illustrating a method for providing a shoulder function according to another embodiment of the present disclosure. The method starts with step S12, in which a check is made to determine whether, in accordance with a first criterion, shoulder driving of the motor vehicle 10 has been detected. If this is not the case, the method starts again from the beginning, until finally in step S12 shoulder driving of the motor vehicle 10 has been detected. This does not necessarily have to be an actual shoulder driving. Under certain circumstances, this detection can also be based on a false detection of shoulder driving. Furthermore, in step S14, it is checked whether a certain steering behavior, in particular a sharp steering reaction back to the roadway, is also detected. If this is not the case, the method starts again from the beginning with step S12. If such a certain steering behavior of the driver is also detected in S14, the method proceeds to step S16, in which it is checked whether an obstacle ahead of the motor vehicle that is in the same lane as the motor vehicle 10 has been detected.

If this is the case, then in step S18, the execution of the shoulder function is interrupted or the shoulder function is not activated at all, and the method is complete. If, on the other hand, no such obstacle is detected in step S16, the system proceeds to step S20 and activates the shoulder function. In particular, a wheel-selective braking intervention is carried out. Subsequently, i.e., after this activation of the shoulder function in step S20, it can again be checked in step S22 whether an obstacle has now been detected in the same lane as the motor vehicle 10. If this is now the case, the execution of the shoulder function can again be interrupted in step S18. Otherwise, the system proceeds to step S24 and checks whether a further termination criterion for terminating the shoulder function has been met. This may consist, for example, in the fact that the motor vehicle 10 has already left the shoulder 32 and/or there is no detected sharp steering input by the driver, or the like. Such a termination criterion may also be a temporal criterion; for example, it may be provided that the braking intervention is only executed for a predetermined period of time. If this period of time has expired or another termination criterion is met, the system, here too, proceeds to step S18, in which the execution of the shoulder function is terminated. If this termination criterion is not met, the shoulder function continues to be executed and the method continues on to step S20. This sequence is repeated until either an object immediately ahead of the motor vehicle has been detected in step S22 or a termination criterion for terminating the shoulder function is met.

Overall, the examples show how the present disclosure can provide a device and a method for avoiding false activations of a shoulder function, which, by linking the shoulder function with an extended environment detection, make it possible to detect when a driver performs a sharp steering reaction for a reason other than wanting to leave a shoulder, namely for the reason of avoiding an obstacle immediately ahead with which the driver wants to avoid a collision. In this way, a driving intervention that disturbs or irritates the driver can be avoided and potential dangers resulting therefrom eliminated.

REFERENCE SIGN LIST

10 Motor vehicle
12 Assistance system
14 Detecting apparatus
16 Environment sensors
16a Environment sensors
16b Environment sensors
16c Environment sensors
16d Environment sensors
18 Camera
20 Radar
22 Wheels
24 Wheels
26 Wheel speed sensor
28 Actuator
30 Control unit
32 Shoulder
34 Steering angle sensor
36 Lane marking lines
38 Edge of roadway
40 Roadway
42 Obstacle
44 Lane
46 Collison avoidance system
48 Environment model
50 Road map
52 GPS position data
54 Car-to-Infrastructure communication
56 Car-to-Server communication
58 Car-to-Car communication
L Longitudinal axis of the vehicle
S10 Step
S12 Step
S14 Step
S16 Step
S18 Step
S20 Step
S22 Step
S24 Step

The invention claimed is:

1. A method for operating a first assistance system of a motor vehicle for providing a shoulder function, comprising:
   detecting, via a detecting apparatus, shoulder driving of the motor vehicle on a shoulder of a road under a first condition in accordance with at least one predetermined first criterion;
   determining a manual steering reaction of a driver of the motor vehicle under a second condition in accordance with a second criterion, wherein the manual steering reaction is determined from steering inputs indicating an attempt to steer the vehicle back onto the road;
   executing a shoulder function to activate an automatic driving intervention, based on the first criterion and second criterion;
   detecting an obstacle ahead of the motor vehicle in the direction of travel under a third condition in accordance with a specified third criterion; and
   outputting a control signal to influence the execution of the shoulder function.

2. The method according to claim 1, wherein outputting the control signal to influence the execution of the shoulder function comprising configuring the control signal such that the execution is prevented or aborted or that the automatic driving intervention is executed with predetermined reduced intensity.

3. The method according to claim 1, wherein the automatic driving intervention comprises automatic wheel-selective braking, wherein a configured braking force is applied to wheels of the motor vehicle closer to the shoulder of the road.

4. The method according to claim 1, wherein the predetermined first criterion comprises sensor data provided by wheel speed sensors of respective wheels of the motor vehicle, the sensor data comprising a characteristic temporal evolution.

5. The method according to claim 4, wherein the characteristic temporal evolution comprises a temporal evolution of at least one wheel on a first side of the motor vehicle relative to a longitudinal axis of the vehicle that varies more strongly than the temporal evolution of at least one wheel on a second side of the motor vehicle opposite the first side relative to the longitudinal axis of the vehicle.

6. The method according to claim 1,
wherein the predetermined first criterion comprises a predetermined relative position of the motor vehicle relative to a lane marking and/or a roadway boundary, and/or
wherein the predetermined second criterion comprises a detected steering angle and/or a steering angle gradient that is greater than a predetermined limit value.

7. The method according to claim 1, wherein the specified third criterion comprises a determination that the obstacle ahead of the motor vehicle in the direction of travel is in the same lane as the motor vehicle.

8. The method according to claim 1, wherein the specified third criterion comprises that a determined predicted time to collision with the obstacle falls below a specifiable value.

9. The method according to claim 1, wherein detecting the obstacle ahead of the motor vehicle in accordance with the specified third criterion comprises detecting the obstacle via a second assistance system comprising a collision avoidance system, wherein, in the event that the collision avoidance system detects the obstacle, the control signal influencing the execution of the shoulder function is output.

10. The method according to claim 9, further comprising executing one of a plurality of different warning stages in the collision avoidance system, based on a determined predicted time to collision, wherein the control signal influencing the execution of the shoulder function is outputted as soon as one of the different warning stages is activated by the collision avoidance system.

11. The method according to claim 1, further comprising generating a computer-aided environment model in a third assistance system, wherein the computer-aided environment model is based on
the sensor data provided by the at least one detecting apparatus, using position data of the motor vehicle on a stored digital road map, and
at least one item of information provided via a car-to-x communication, wherein the obstacle is detected in accordance with the third criterion based on the computer-aided environment model.

12. An assistance system for a motor vehicle for providing a shoulder function, comprising:
at least one detection apparatus; and
a control unit, operatively coupled to the detection apparatus, wherein the control unit and detection apparatus are configured to detect shoulder driving of the motor vehicle on a shoulder of a road under a first condition in accordance with at least one predetermined first criterion;
determine a manual steering reaction of a driver of the motor vehicle under a second
condition in accordance with a second criterion, wherein the manual steering reaction is determined from steering inputs indicating an attempt to steer the vehicle back onto the road;
execute a shoulder function to activate an automatic driving intervention, based on the first criterion and second criterion;
detect an obstacle ahead of the motor vehicle in the direction of travel under a third condition in accordance with a specified third criterion; and
output a control signal to influence the execution of the shoulder function.

13. The assistance system according to claim 12, wherein the control unit and detection apparatus are configured to output the control signal to influence the execution of the shoulder function by configuring the control signal such that the execution is prevented or aborted or that the automatic driving intervention is executed with predetermined reduced intensity.

14. The assistance system according to claim 12, wherein the automatic driving intervention comprises automatic wheel-selective braking, wherein a configured braking force is applied to wheels of the motor vehicle closer to the shoulder of the road.

15. The assistance system according to claim 12, wherein the predetermined first criterion comprises sensor data provided by wheel speed sensors of respective wheels of the motor vehicle, the sensor data comprising a characteristic temporal evolution.

16. The assistance system according to claim 15, wherein the characteristic temporal evolution comprises a temporal evolution of at least one wheel on a first side of the motor vehicle relative to a longitudinal axis of the vehicle that varies more strongly than the temporal evolution of at least one wheel on a second side of the motor vehicle opposite the first side relative to the longitudinal axis of the vehicle.

17. The assistance system according to claim 12,
wherein the predetermined first criterion comprises a predetermined relative position of the motor vehicle relative to a lane marking and/or a roadway boundary, and/or
wherein the predetermined second criterion comprises a detected steering angle and/or a steering angle gradient that is greater than a predetermined limit value.

18. The assistance system according to claim 12, wherein the specified third criterion comprises one of:
a determination that the obstacle ahead of the motor vehicle in the direction of travel is in the same lane as the motor vehicle, or
a determination that a predicted time to collision with the obstacle falls below a specifiable value.

19. The assistance system according to claim 12, further comprising a second assistance system comprising a collision avoidance system for detecting the obstacle ahead of the motor vehicle in accordance with the specified third criterion, wherein, in the event that the collision avoidance system detects the obstacle, the control signal influencing the execution of the shoulder function is output.

20. The assistance system according to claim 19, wherein the control unit and detection apparatus are configured to execute one of a plurality of different warning stages in the collision avoidance system, based on a determined predicted time to collision, wherein the control signal influencing the execution of the shoulder function is outputted as soon as one of the different warning stages is activated by the collision avoidance system.

* * * * *